United States Patent [19]

Mogavero

[11] Patent Number: 5,125,693
[45] Date of Patent: Jun. 30, 1992

[54] BRANCH CONNECTOR FOR CONNECTION BETWEEN A MAIN FLEXIBLE PIPE AND A SECONDARY FLEXIBLE PIPE

[75] Inventor: Cesare Mogavero, Turin, Italy

[73] Assignee: Saiag Industria SPA, Torino, Italy

[21] Appl. No.: 729,310

[22] Filed: Jul. 12, 1991

[51] Int. Cl.$^5$ ............................................. F16L 41/00
[52] U.S. Cl. ................................. 285/156; 285/292; 285/371; 285/423
[58] Field of Search ............... 285/156, 292, 423, 381, 285/909, 371

[56] References Cited

U.S. PATENT DOCUMENTS

| 3,943,334 | 3/1976 | Sturm | 285/292 X |
| 4,631,098 | 12/1986 | Pithouse et al. | 285/381 X |
| 4,650,228 | 3/1987 | McMills et al. | 285/909 X |
| 4,660,867 | 4/1987 | Kemper et al. | 285/256 |
| 4,676,532 | 6/1987 | Gronau | 285/156 |
| 4,718,700 | 1/1988 | Horch et al. | 285/156 |
| 4,848,801 | 7/1989 | Grabowski | 285/156 X |
| 4,903,998 | 2/1990 | Stanley | 285/156 |
| 4,997,213 | 3/1991 | Traner et al. | 265/915 X |
| 4,998,337 | 3/1991 | Tiekink | 285/292 X |
| 5,033,775 | 7/1991 | Matte et al. | 285/423 X |

FOREIGN PATENT DOCUMENTS 2182408  5/1987  United Kingdom ............... 285/292

Primary Examiner—Dave W. Arola
Attorney, Agent, or Firm—Sughrue, Mion, Zinn, Macpeak & Seas

[57] ABSTRACT

The connector comprises a rigid, tubular insert having a first end, a second end and at least one third end, onto which the ends of first and second branches of a main pipe and of a secondary pipe are fitted respectively, and a covering of plastics material which encloses the ends of the insert and the ends of the pipes. The covering has a continuous internal circumferential projection in correspondence with each end of the insert, the projections being adapted to engage corresponding annular grooves in the ends of the two branches of the main pipe and of the secondary pipe so as to lock the pipes on the respective ends of the rigid insert and create liquid-tight seals.

5 Claims, 1 Drawing Sheet

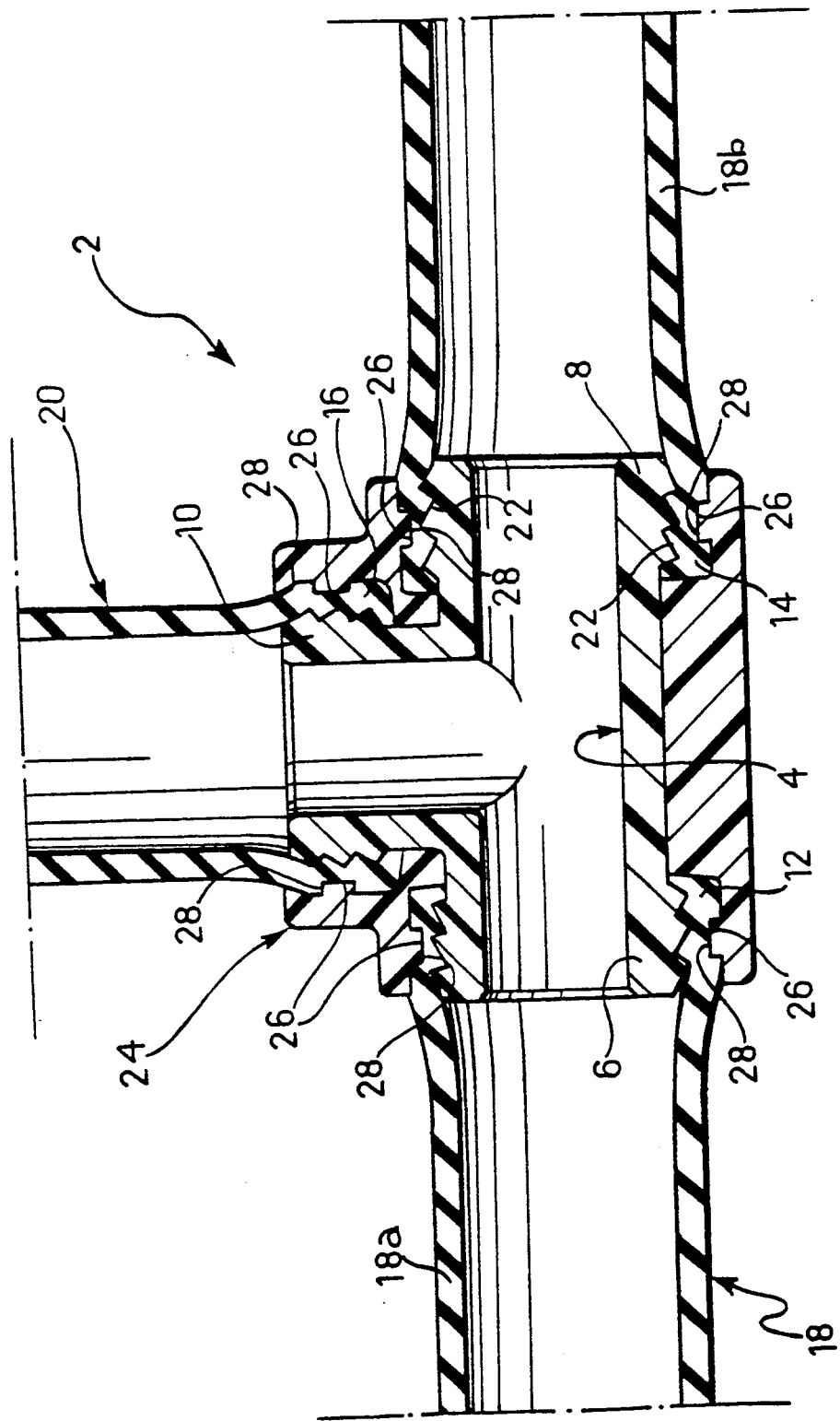

BRANCH CONNECTOR FOR CONNECTION BETWEEN A MAIN FLEXIBLE PIPE AND A SECONDARY FLEXIBLE PIPE

BACKGROUND OF THE INVENTION

The present invention relates to a branch connector for connection between a main flexible pipe and at least one secondary flexible pipe, particularly for motor-vehicle cooling systems.

More specifically, the present invention relates to a branch connector of the type comprising a rigid, tubular insert with a first end, a second end and at least one third end, onto which the ends of a first branch of the main pipe, of a second branch of the main pipe and of at least one secondary pipe are fitted respectively, and a covering of plastics material which encloses the ends of the rigid insert and the ends of the main pipe and of the secondary pipe.

A known connector of the type indicated above is described in European patent application No. EP-A-243216. According to this document, the outer covering of the connector is injection-moulded onto the rigid insert after the ends of the first and second branches of the main pipe and of the secondary pipe have been fitted onto its ends. The material used for the covering must shrink by at least 1% as it cools after moulding so that, by virtue of its contraction, it exerts pressure on the ends of the main and secondary pipes and on the ends of the connector to create seals which are liquid-tight in use.

It is therefore necessary for the covering to be fairly thick and to extend axially for a certain distance at the ends of the connector which are covered by the ends of the main and secondary pipes in order to exert sufficient gripping force. This increases the costs of the material used and the time necessary to effect the moulding. Moreover, any defects or imperfections which may arise during the moulding of the covering seriously compromise its performance. Furthermore, the selection of the materials to be used for the covering is restricted to those which have high coefficients of shrinkage after moulding.

SUMMARY OF THE INVENTION

The object of the present invention is to provide a branch connector of the type defined at the beginning of the present description which can be used at high operating temperatures and pressures and which overcomes the aforementioned problems of known connectors.

According to the present invention, this object is achieved by the provision of a branch connector of the type specified above, characterised in that the covering has a continuous, internal circumferential projection in correspondence with each end of the insert, the projections being adapted to engage corresponding annular grooves in the ends of the two branches of the main pipe and of the secondary pipe so as to lock the pipes on the respective ends of the rigid insert, creating liquid-tight seals.

According to the invention, the projections act as additional barriers against any liquid which may already have infiltrated between the contact surfaces of the rigid insert and of the main and secondary pipes and which may tend to flow outwardly.

BRIEF DESCRIPTION OF THE DRAWINGS

Further advantages and characteristics of the present invention will become clear from the detailed description which follows with reference to the appended drawing provided purely by way of non-limiting example, the sole figure of which is an axial section of a branch connector according to the invention.

DETAILED DESCRIPTION OF THE INVENTION

In the drawing, a branch connector for use in motor-vehicle cooling systems is indicated with the reference number 2. The connector 2 includes a T-shaped, rigid, tubular insert 4 of plastics material. The insert 4 has first, second and third ends 6, 8, 10 onto which the ends 12, 14 and 16 of first and second branches 18a and 18b of the main pipe 18 and of the secondary pipe 20 respectively, are fitted with radial interference.

In known manner, the pipes 18 and 20 are made of elastomeric material, possibly reinforced by an internal or external textile reinforcement, and are adapted to withstand the usual temperatures of the liquids used in motor-vehicle cooling systems. External, circumferential retaining notches 22 are also provided on the ends 6, 8, 10 of the insert 4 for improving the liquid-tight seal between the connector 4 and the pipes 18, 20.

The ends 6, 8, 10 of the insert 4 which are covered by the ends of the pipes 18, 20 are provided, preferably by injection-moulding, with a covering 24 of plastics material which is also T-shaped. The covering 24 has a continuous internal projection 26 in correspondence with each end 6, 8, 10 of the insert 4, the projections 26 being adapted to engage corresponding annular grooves 28 in the ends of the two branches 18a, 18b of the main pipe 18 and in the end of the secondary pipe 20 so as to lock the pipes on the respective ends 6, 8, 10, creating liquid-tight seals.

The plastics materials used to form the rigid insert 4 and the covering 24 are selected from those which are resistant to the liquids usually used in motor-vehicle cooling systems at normal running temperatures. In particular, the materials preferred for forming the covering 24 and the insert 4 are low-shrinkage glass-filled polypropylene and 6.6 glass-filled polyamide respectively.

In embodiments of the invention which are not shown, the branch connector may house plastics or metal drain valves and/or plugs inserted in the rigid insert 4 or in the covering 24. Moreover, instead of being T-shaped, the connector may be formed in the shape of a double T, or with a curved main body from which one or more branches extend, or in other shapes usually used for conventional connectors.

Naturally, the details of construction and forms of embodiment may be varied widely with respect to those described and illustrated, without thereby departing from the scope of the present invention.

I claim:

1. A branch connector for connection between a main flexible pipe and at least one secondary flexible pipe, particularly for motor-vehicle cooling systems, comprising:

a rigid, tubular insert with a first end, a second end and at least one third end, onto which the ends of a first branch of the main pipe, of a second branch of the main pipe and of at least one secondary pipe are fitted respectively, each of said ends of said first and second branches of the main pipe and said secondary pipe having annular grooves therein with said annular grooves having a depth less than the thickness of the pipes, and a covering of plastics material which encloses the ends of the insert and the ends of the two branches of the main pipe and of the secondary pipe, the covering having a continuous, internal circumferential projection in correspondence with each end of the insert with the projections engaging said corresponding annular grooves in the respective ends of the two branches of the main pipe and of the secondary pipe so as to lock the pipes on the respective ends of the rigid insert, creating liquid-tight seals.

2. A connector according to claim 1, wherein the material constituting the covering is low-shrinkage, glass-filled polypropylene.

3. A connector according to claim 1, wherein the ends of the insert have external, circumferential retaining notches onto which the ends of the first and second branches of the main pipe and the end of the at least one secondary pipe are fitted with radial interference.

4. A connector according to claim 1, wherein the covering of plastics material is injection-moulded around the insert after the ends of the first and second branches of the main pipe and the end of the at least one secondary pipe have been fitted onto its end.

5. A connector according to claim 1, wherein the insert and the covering are generally T-shaped.

* * * * *

UNITED STATES PATENT AND TRADEMARK OFFICE
CERTIFICATE OF CORRECTION

PATENT NO. : 5,125,693

DATED : June 30, 1992

INVENTOR(S) : Cesare MOGAVERO

It is certified that error appears in the above-identified patent and that said Letters Patent is hereby corrected as shown below:

On the title page:

[30] Foreign Application Priority Data

July 12, 1990 [IT] ITALY .........67534-A/90

Signed and Sealed this

Sixteenth Day of November, 1993

Attest:

BRUCE LEHMAN

*Attesting Officer*      *Commissioner of Patents and Trademarks*